May 13, 1952 J. W. J. ACKERMANS 2,596,355
LET-DOWN TYPE AUTOMOBILE TOP
Filed Jan. 18, 1947 5 Sheets-Sheet 4

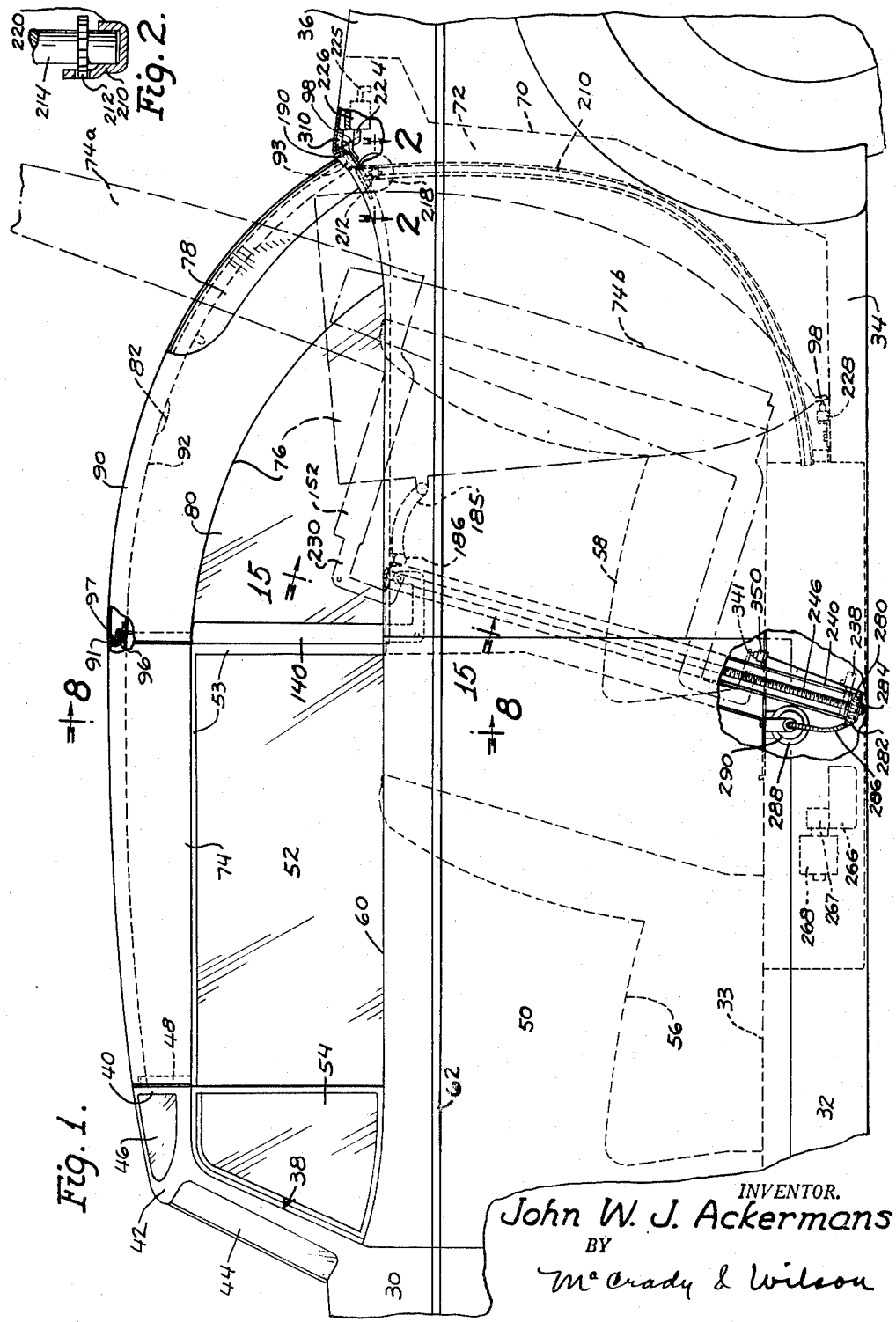

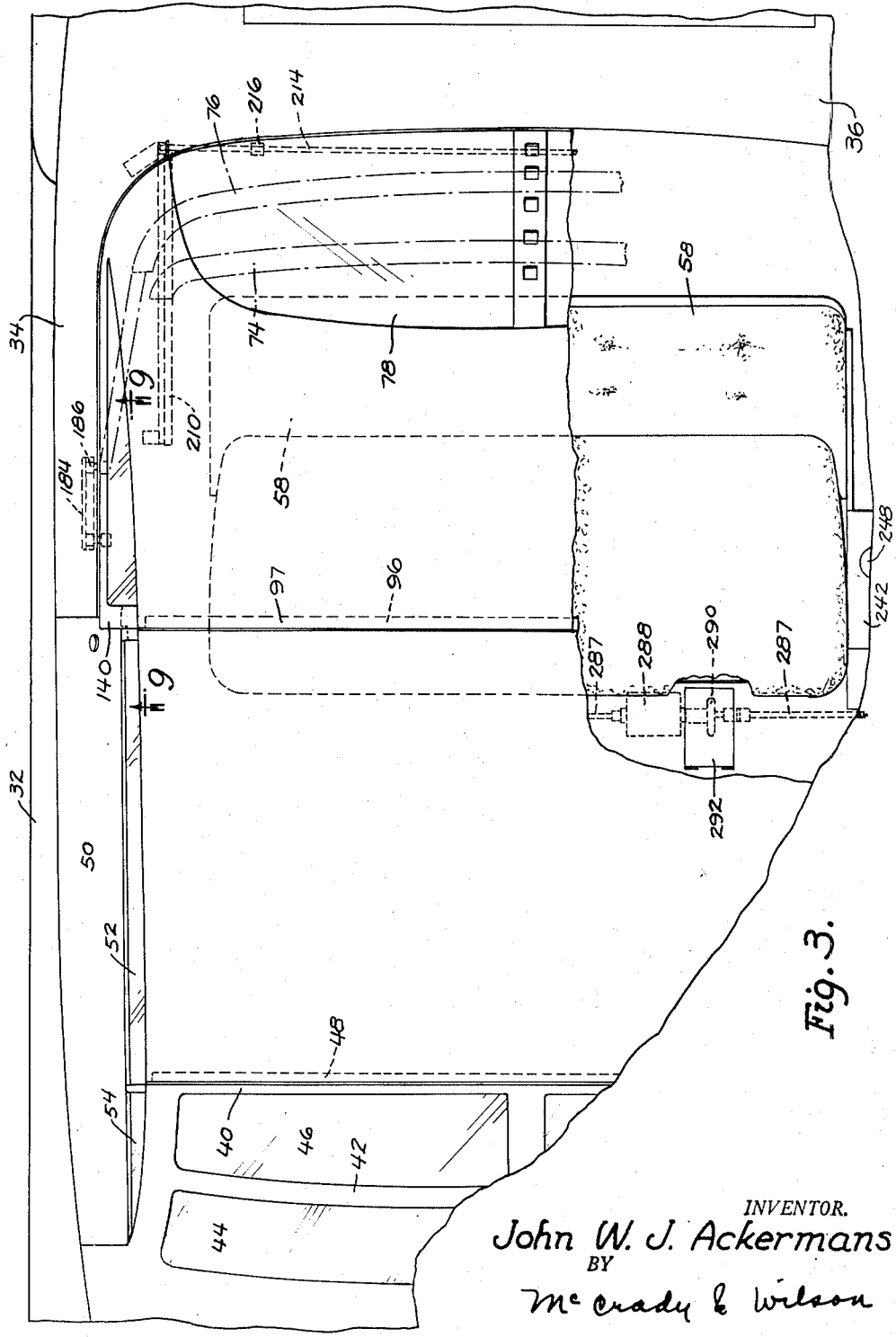

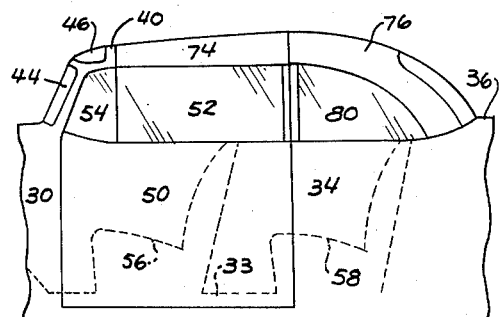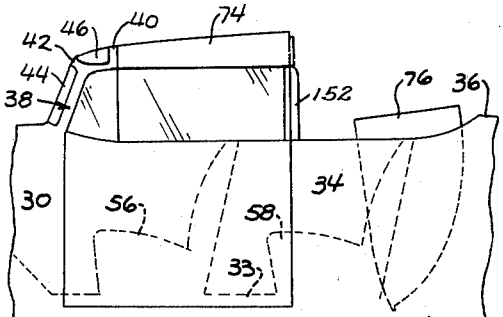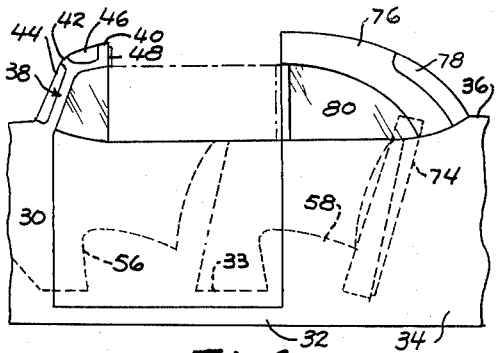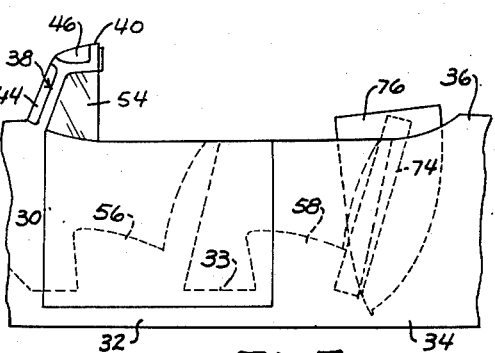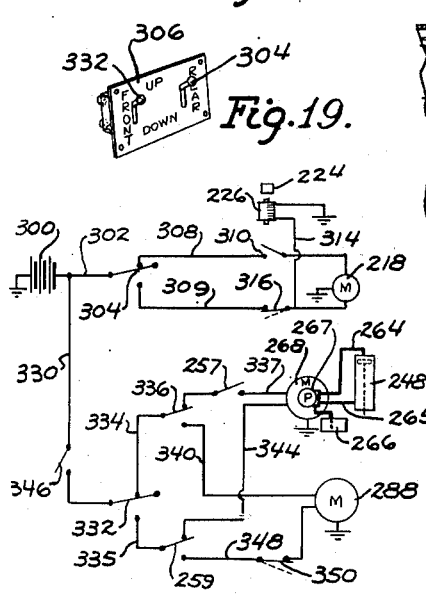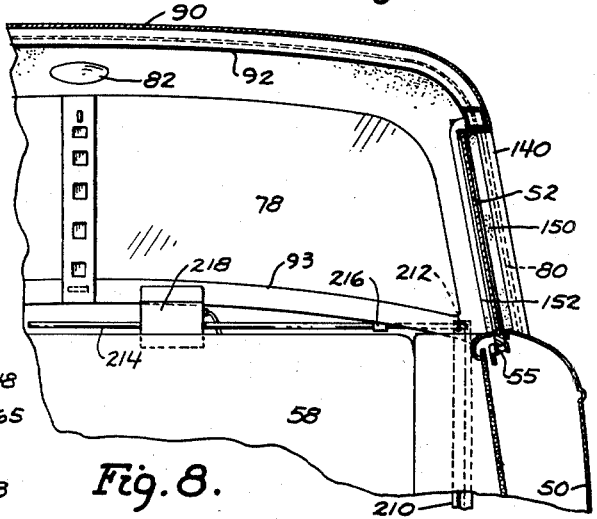

INVENTOR.
John W. J. Ackermans
BY
McCrady & Wilson
ATTORNEYS.

May 13, 1952      J. W. J. ACKERMANS      2,596,355
LET-DOWN TYPE AUTOMOBILE TOP
Filed Jan. 18, 1947      5 Sheets-Sheet 5
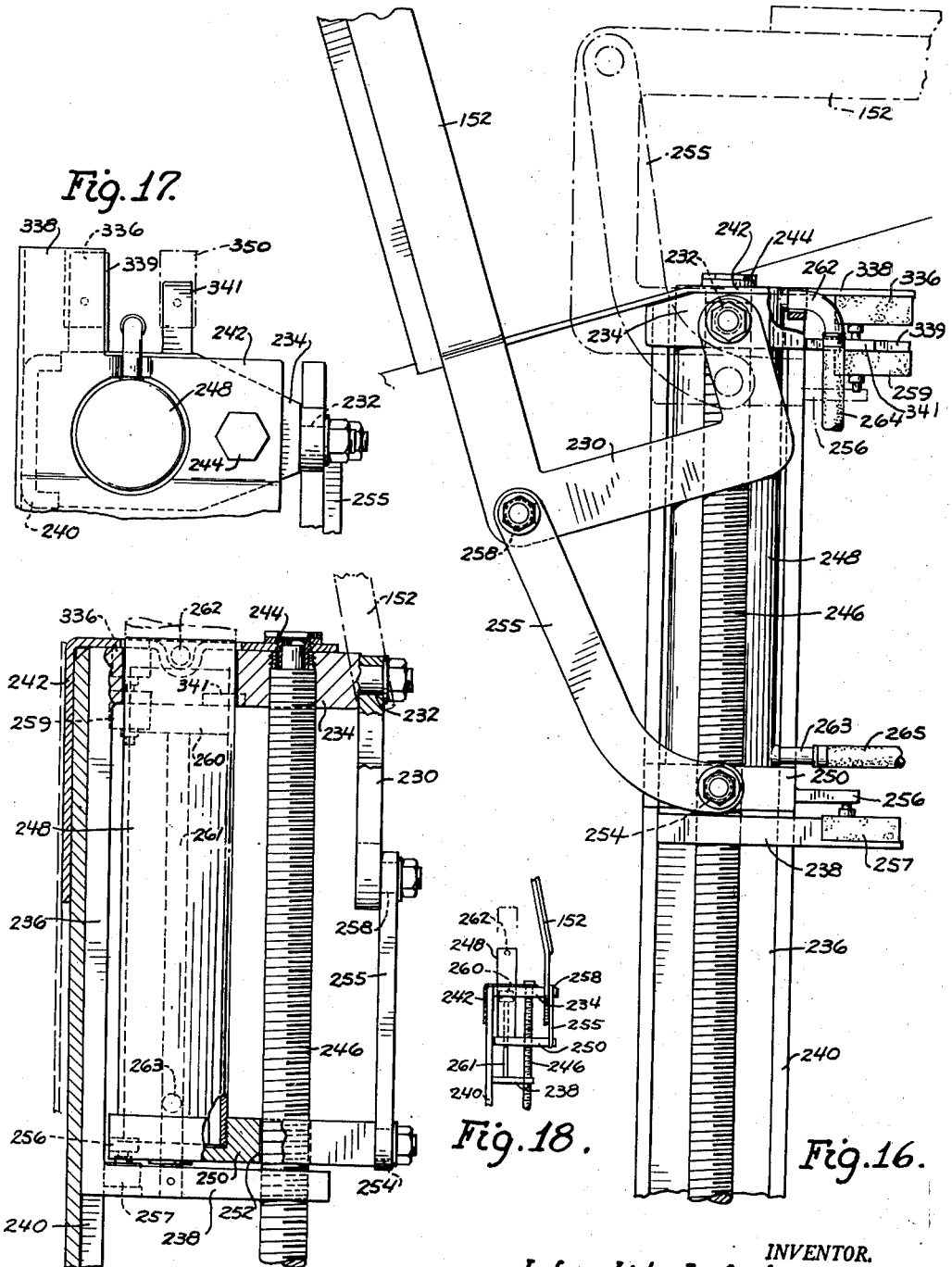
INVENTOR.
John W. J. Ackermans
BY
McCrady & Wilson
ATTORNEYS.

Patented May 13, 1952

2,596,355

UNITED STATES PATENT OFFICE 2,596,355

LET-DOWN TYPE AUTOMOBILE TOP

John W. J. Ackermans, Detroit, Mich.

Application January 18, 1947, Serial No. 722,859

10 Claims. (Cl. 296—107)

This invention relates to automobile bodies, and more particularly to an automobile body of the rigid convertible coupe type, wherein two separate rigid top sections are arranged to be moved rearwardly and downwardly into a booth at the rear and sides of the rear passenger seat. The mechanism permits either of the top sections to remain within the booth while the other is in its upper position, with the result that the following types of bodies can be formed:

1. The completely enclosed coupe type, with both top sections in their raised positions.

2. The landaulet type, formed by lowering the rear top section only.

3. The Victoria top type, formed by putting the rear top section only in its raised position. In this position of the top, the conventional door side windows may be raised to form an open or "sky-view" roof type body.

4. The roadster or open type, by lowering both sections into the booth.

One object of the invention is the design of a practical convertible automobile body on which no flexible covering or fabric top material is used on the outside, thus preventing the rapid deterioration of that material by the elements and consequently to enhance the resale price of the car.

Another object of the invention is to provide a body that is readily convertible into four or several distinctive and selective types as desired by the driver or other occupants of the car.

A further object of the invention is a body with two independently convertible solid top sections that can selectively be lodged behind and on the sides of the rear seat without interfering with occupants of that rear seat and still preserving a good appearance of each selective type of body.

Another object is to reserve a maximum amount of space in the rear deck and luggage compartment, by making the booth as compact as possible.

Another object is to provide new mechanical methods, for each of the folding rigid sections, that are imperative for guiding each section to its predetermined place in the booth, by special movements whereto power may be applied.

Still another object of the invention is to place the supporting pillar of the front section in line and on the inside of the upright pillar of the side window of the rear section, thus giving the appearance of one single pillar, from either the outside or the inside of the body when it is completely closed.

A further object is to leave clearance space between these two pillars that may be opened or closed by means of an adjustable weatherstrip that may be operated from the rear compartment independently of the windows.

Another important object is to provide a rearwardly extending windshield assembly that permits shortening of the overall length of the two top sections, thus allowing maximum rear vision when only the front top section, or both sections, are in the booth. This prevents also vertical protrusion of both sections over the body belt line.

Another object is to allow opportunity to make provision for wide back windows, in the rear top section, which eliminate the blind spots in the corners and thus give better rear vision when the rear top section is up or the body completely closed, a feature which has been practically impossible in present type convertibles with canvas or other flexible material top coverings.

A further object of the invention is to provide a convertible automobile body wherein the top, when in the closed position, shall be equal in rigidity and weatherproof characteristics to the conventional coupe type automobile body.

A further object is to provide automatically and manually operable latching means for retaining the rear top section in its raised position.

Further objects and advantages of the invention will be apparent from the following description, taken in connection with the appended drawings, in which:

Fig. 1 is a view in side elevation, with parts broken away, of an automobile body embodying the present invention;

Fig. 2 is an enlarged sectional view of a detail, taken on the line 2—2 of Fig. 1;

Fig. 3 is a plan view, partially broken away, of the structure shown in Fig. 1;

Fig. 4 is a diagrammatic view showing the top in fully closed position;

Fig. 5 is a similar view showing the rear top section positioned in the booth, to produce the landaulet type vehicle;

Fig. 6 is a similar view showing the front top section only positioned in the booth, to produce the Victoria top type body;

Fig. 7 is a similar view showing both top sections lowered into the booth, to produce the roadster or open type vehicle;

Fig. 8 is a sectional view taken substantially on the line 8—8 of Fig. 1;

Fig. 15 is an enlarged sectional view taken on the line 15—15 of Fig. 1, and showing the actuating mechanism for the front top section;

Fig. 16 is a right side view in car position, partly in section, of the mechanism of Fig. 15;

Fig. 17 is a plan view of the mechanism shown in Fig. 15;

Fig. 18 is a diagrammatic view showing the mechanism of Fig. 15 in an intermediate stage of operation;

Fig. 19 is a perspective view showing the switch panel whereby the raising and lowering of the top sections is controlled; and Fig. 20 is a wiring diagram of the device.

Figure 10:
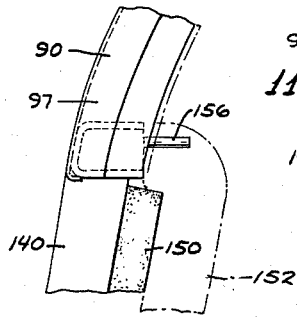
Fig. 10 is an enlarged elevation of a detail, showing a portion of the structure of Fig. 9 as viewed from the left of the latter figure.
Figure 11:
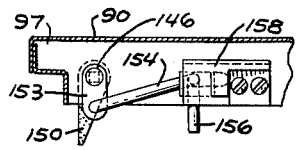
Fig. 11 is a sectional view of a detail, taken on the line 11—11 of Fig. 9.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As will be seen in Figs. 1, 4, 5, 6 and 7, the automobile body is of the two-door type and comprises a cowl 30, a sill 32, a floor 33, and a rear side panel 34, all of these parts being stationary elements of the body. At the rear of the passenger compartment is a deck panel 36, which with the usual deck lid (not shown) forms a cover for the luggage compartment of the car.

Secured to the cowl 30 is a windshield assembly comprising a frame 38, which includes a transverse bow 40 and a header 42. The frame is designed to retain the conventional windshield 44 and a pair of curved glass panes 46 which in effect form transparent panels in the roof of the vehicle. The bow 40 is rabbeted at its rear surface to form a rearwardly extending flange 48 (Fig. 6), which receives the forward edge of the front top section as hereinafter described.

This rearwardly extending windshield assembly permits the shortening of the front top section and prevents that section, when in the booth, from extending too far above the body belt line and thus obstructing rear vision.

The body is provided at each side with a door 50, hinged at its forward edge and carrying a window pane 52 having a frame 53, and vertically movable by means of actuating mechanism 55 of any suitable design. Forward of the pane 52 is a smaller pane 54 which is rotatable about a vertical axis for ventilation in the known manner. The vehicle is also provided with a conventional front seat 56, and with a rear seat 58 which, as shown in Fig. 3, is positioned forwardly and inwardly of the panels 36 and 34 by a sufficient distance to allow space to receive the two top sections as hereinafter described. The upper edge of door 50 and the upper edges of the rear panel 34 and of the deck panel 36 form a continuous line 60 which is herein referred to as the body belt line. A horizontal external belt molding 62 (Fig. 1) extends throughout the greater portion of the length of the body.

As shown in Fig. 1, a partition 70 forms the forward wall of the luggage compartment, the space 72 between the wall 70 and the rear seat 58 being herein called the booth.

The movable front top section is indicated at 74, and the movable rear top section or balloon is indicated at 76. The latter section comprises a pair of window panes 78 to permit rear vision, and is provided with side windows 80 which are fixed relative to the remainder of the rear top section. This section may also be provided with a dome light 82.

As will be seen in Fig. 1, the rear top section 76 is formed with a rigid roof panel 90 secured to a suitable frame. A conventional head lining 92 is attached in the usual manner. The front top section is similarly formed with a roof panel, frame, and head lining, which are similarly numbered. The front and rear top sections 74 and 76 are rabbeted to fit together snugly by means of inter-engaging flanges 96, 97 formed by turning the panel 90 inwardly as shown, and are provided with weatherstrips 91. The lower rear rail 93 of the rear top section carries a substantially central detent 98 projecting therefrom to retain the section in raised position, as described hereinafter.

Figure 12:
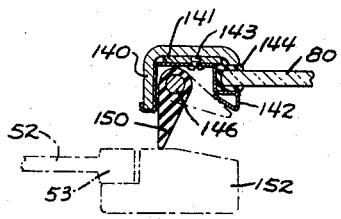
Fig. 12 is a sectional detail view taken on the line 12—12 of Fig. 9.
Figure 9:
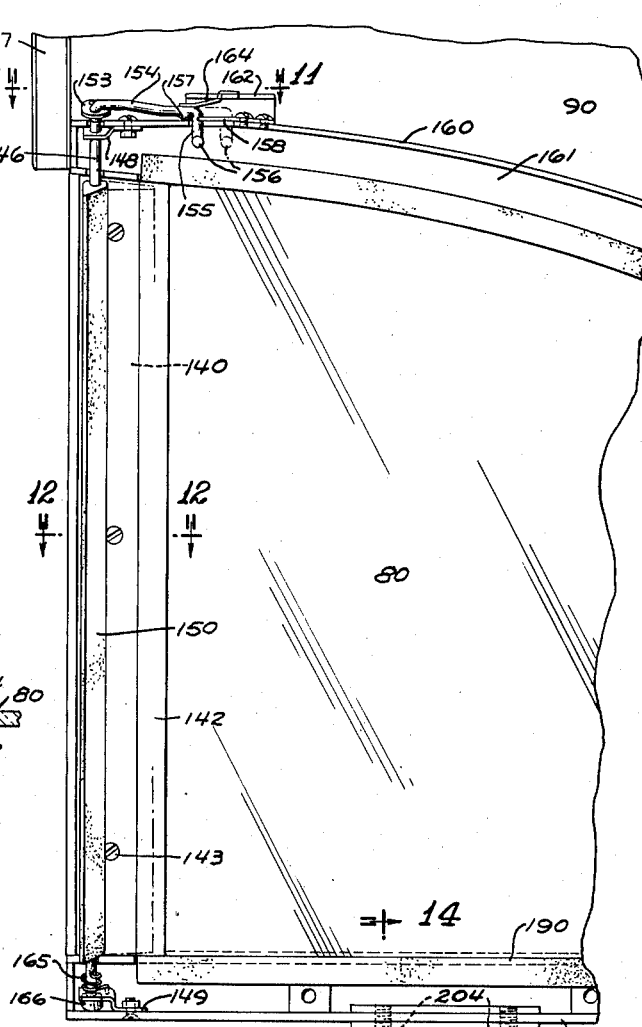
Fig. 9 is an enlarged detail of a portion of the rear top section, corresponding to a section taken on the line 9—9 of Fig. 3.

The rear top section is formed at either side with a vertical pillar 140 (Figs. 9–12) of channel shape, and a molding 142 is mounted within the pillar by means of screws 143 threaded into a tapping plate 141. The molding 142 serves to retain a rubber mounting 144 for the window pane 80. A vertical rod 146 extends longitudinally within the channel 140, its upper and lower ends being pivotally secured in guide plates 148, 149, as shown in Fig. 9. To the rod 146 is secured a weather strip 150 of rubber or the like material which, in the position of the parts shown in Fig. 12, extends inwardly to contact the inner pillar 152 of the front top section, the pillar 152 being laterally aligned with the pillar 140 so as to give the appearance of a single pillar when the top is completely closed. By means hereinafter described, the weatherstrip 150 may be rotated to the dotted line position shown in Fig. 12.

The upper end of the rod 146 is squared to engage in a squared hole in a lever arm 153, which is secured to the rod 146 as by riveting the material of the rod after the weatherstrip 150 and guide plates 148, 149 have been mounted on the rod. A push rod 154 has its forward bent end pivotally engaged in an aperture at the projecting end of lever arm 153, its rear portion being bent downwardly to form a vertical portion 155, and then inwardly to form a handle 156. In order to retain the weatherstrip 150 in its closed position, a boss 157 is formed on the lower surface of the push rod 154, to engage the forward edge of a slotted plate 158 which is secured to a flange 160 formed on the upper edge of a channel shaped frame member 161. The plate 158 is preferably formed as the lower leg of a channel member, the upper leg 162 of which is apertured to retain a leaf spring 164. The free end of spring 164 presses downwardly against the push rod 154 to prevent rattling and to retain the boss 157 in yielding engagement with the front edge of the plate 158. At the bottom of the rod 146 is mounted a coil spring 165, the same being stressed to exert a torsional force upon the rod tending to move the weatherstrip 150 to its open position. One end of the spring 165 is secured to the guide plate 149, while the other end of the spring is secured in a hole in the rod 146. The lower end of rod 146 is formed with an enlarged head 166 which rests upon the horizontal arm of a contoured channel-shaped rail 168 which forms part of the frame of the window pane 80, as more fully described hereinafter.

In order to open the weatherstrip 150, the user will raise handle 156 sufficiently to disengage boss 157 from the front edge of plate 158, whereupon the spring 165 will rotate the weatherstrip to open position, moving the push rod 154 from the full line to the dotted line position shown in Fig. 9. To close the weatherstrip, the handle 156 will be moved forwardly until boss 157 engages the front edge of plate 158, which will retain the weatherstrip in closed position.

Figures 13, 14:
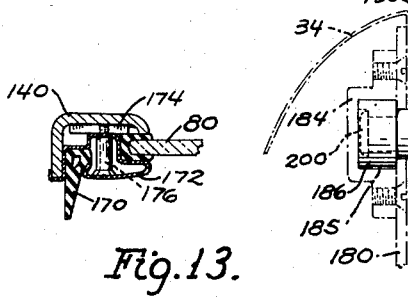
Fig. 13 is a view similar to Fig. 12, but showing a modified form of pillar assembly with stationary weatherstrip.
Fig. 14 is a sectional view of a detail, taken on the line 14—14 of Fig. 9.

If desired, the movable weatherstrip 150 may be replaced by a fixed weatherstrip 170 as shown in Fig. 13. The weatherstrip 170 is held fixedly in position by a molding 172, the latter being secured to a fastening strip 174 in the pillar by means of screws 176.

As indicated in Fig. 14, each of the side panels 34 is provided with a body bracket 180 of relatively heavy metal. The body bracket 180 is formed with an arcuate slot, as indicated in Figs. 1 and 14, and secured to the face of body bracket 180 is a channel member 184, the same being of arcuate form to correspond with the arcuate form of the slot and shaped to receive and form a track 185 for a roller 186.

The lower rails 168 of the rear top section 76 are continuous with the rear rail 93 and carry a rubber weatherstrip 190, the latter being designed to seat against the upper edges of the panels 34 and 36. Each of the rails 168 receives the lower edge of the glass pane 80, the latter being held in place by means of a molding 192 which is secured to the rail 168 by means of screws 194. Secured to the lower surface of the rail 168 is a bracket 196 which extends downwardly from the rail and thence outwardly in a horizontal direction to form an arm 198 the outer end of which is shaped to form a stud shaft upon which the roller 186 may rotate. The roller is held in place on the arm 198 by means of a peened head 200 seated within a counterbore of the roller. The bracket 196 is provided with an upper horizontal flange 202 which is secured to the horizontal flange of the rail 168 by screws 204. As will be seen in Fig. 1, the track 185 slopes slightly upwardly and thence downwardly and to the rear, the purpose being to slightly raise the rear top section 76 when starting to move it into the booth, this upward movement facilitating the separation of the flanges 96, 97 and other corresponding interengaging parts of the rear top section, which are in sealed contact with the front top section 74, and also to counteract the vertical drop of the rear end of the rear top section, until the peak of the arched forward track 185 is reached.

At either side of the booth 72 and at the rear thereof is provided a curved track 210 (Figs. 1 and 8), designed to guide the rear top section 76 into its nested position within the booth. The upper and lower ends of each of the tracks are suitably secured to the body structure, and each track is provided with perforations which act as teeth to form a curved rack which receives one of two pinions 212, which are mounted at either end of a transverse horizontal shaft 214. The shaft 214 is journaled in journals 216 suitably fixed to the rear top section 76, and is driven by a reversible electric motor 218 which is likewise fixedly mounted on the rear top section. As will be seen in Fig. 2 each of the racks 210 is formed of channel shape, flange 220 of which engages the end of the shaft 214 and maintains the pinion 212 in operative engagement with the teeth of the rack.

It will be seen that when the motor 218 is caused to rotate in one direction the pinions 212 will move downwardly along the racks, drawing the section 76 with it to the position shown in dotted lines in Fig. 1. Likewise, when the motor is caused to rotate in the reverse direction it will move the section 76 from its lowered position to the position shown in full lines in Fig. 6. The racks 210 are so shaped that when the section 76 is being moved downwardly by the motor 218 its forward end will also be drawn rearwardly, causing the roller 186 to travel along the track 185 from its most forward position to its most rearward position, as indicated in dotted lines in Fig. 1.

When the rear top section 76 is in its raised position, the detent 98 at its rear is engaged by a reciprocable bolt 224 to retain the section 76 fixedly in position. The bolt 224 is urged by spring means (not shown) to the position shown in Fig. 1, and is retractible by the cam action of detent 98 in its upward movement, in the manner of an ordinary door latch. When the parts are in the positions shown in Fig. 1, the bolt may be retracted manually by means of a handle 225 to which access is had from within the booth 72. Normally, however, the bolt is retracted by means of a solenoid 226 which is energized in a manner hereinafter described.

On top of the floor structure is mounted a double switch mechanism 228 positioned to be contacted by the detent 98 when the section 76 reaches its lowermost, fully nested, position. Contact of the detent with the switch mechanism opens one switch so as to arrest further downward movement of the section 76, and closes another switch so as to permit lowering of the front top section 74. The arrangement is further described hereinafter in connection with Fig. 20, wherein the two switches are respectively designated as 316 and 346.

The front top section 74 is moved into the nested position indicated in broken lines at 74b by first rotating the section about a horizontal pivot and then moving the entire assembly downward substantially parallel to the back of the rear seat, to its final position between the rear top section 76 and the rear seat 58. This can be done only after the rear top section has been lowered into place as above described. In the case of the front top section the only parts which are moved are the section 74 proper and the pillars 152. The side window panes 52, as well as the ventilating windows 54, are part of the door assembly.

Each of the inner pillars 152 is formed with an angular extension 230 (Figs. 15–18) which, when section 74 is in raised position, extends downwardly, thence rearwardly, and thence upwardly, terminating in an apertured end which fits over a pivot 232. Pivot 232 is mounted in the upper arm 234 of a movable bracket, which also comprises a vertical reach 236 and a lower arm 238. The bracket is guided in its upward and downward movements by a channel member 240 the legs of which embrace the reach 236. When the parts are in the positions shown in Figs. 15 and 16, the upper arm 234 seats against an apertured stationary body bracket 242 which is fixed to the frame of the body. It will be understood that the non-electrical structure shown in Figs. 15–18 is provided at each side of the vehicle body, although for simplicity only the structure at the left side of the body is specifically described herein.

Threaded into the body bracket 242 is a bushing 244 in which is rotatably mounted the upper end of a screwshaft 246 which is threadedly engaged in aligned apertures in the arms 234 and 238, so that rotation of the screwshaft will move the bracket 234, 238 upwardly or downwardly.

Reciprocable in an opening in the arm 234 is a cylinder 248, the upper end of which is closed as shown, while its lower end is closed by being threaded into a recess in a base plate 250. The plate 250 is provided with a bore 252 which clears the screwshaft 246. At its outer edge, plate 250 is provided with a pivot 254 over which fits the lower end of a link 255. The link 255 is attached at its upper end to a pivot 258 mounted at the bend of the extension 230. The plate 250 on one side of the vehicle (in the illustrated embodiment, the left side) is also provided with an extension 256 which, when the plate is moved to its lowermost position by cylinder 248, contacts and opens a normally closed switch 257 to arrest further movement of the cylinder, as hereinafter described in connection with Fig. 20.

At the upper limit of its movement, the extension 256 contacts a two-way switch 259. Contact of the extension with the switch 259 opens one circuit, thereby shutting off the supply of hydraulic fluid to the cylinder 248, and closes another circuit to thereby start rotation of the screwshaft 246. The arrangement is further described in connection with Fig. 20.

A piston 260 is mounted on a piston rod 261 within the cylinder 248, the lower end of the piston rod passing through a bore formed at the center of the recess in plate 250, and being secured to bracket arm 238. Adjacent the upper and lower ends of the cylinder are fitttings 262, 263 which are connected through flexible tubing 264, 265 to a source of hydraulic fluid under pressure, indicated schematically in Fig. 1 as a reservoir 266 from which hydraulic fluid is pumped under pressure by a hydraulic pump 267 driven by an electric motor 268. Suitable pressure regulating means and valve means are provided, in known manner, to control the outlet pressure of the pump 267 and the flow of fluid therefrom through the tubing to the cylinder 248, and the return flow therefrom to the reservoir.

In assembling the bracket 234, 238 with the cylinder 248 and piston 260 the base plate 250 is inserted between the two arms of the bracket, the piston is then inserted through the apertures in body bracket 242 and arm 234, and the piston rod is passed through the bore in the recess in plate 250 and secured to the lower bracket arm 238. The cylinder, with the fitting 263 removed, is then inserted from the top and over the piston, its lower end being screwed into the recess in plate 250, which acts as a head for the cylinder.

As shown in Fig. 1, the screwshaft 246 is provided at its lower end with a gear 289 which is engaged by a worm 282, gears 280 and 282 being journaled in a suitable bracket 284 fixed to the floor frame of the body. The bracket 284 is provided with a bushing, similar to the bushing 244, to receive the lower end of the screwshaft 246. The worm 282 is driven through a flexible shaft 286 and a rigid shaft 287 (Fig. 3) which in turn is driven by a reversible electric motor 288, so that rotation of the motor will turn the screwshaft 246 and move the bracket 234, 238, with its associated mechanism, upwardly or downwardly. In order to permit manual actuation of the screwshaft, a handwheel 290 (Fig. 3) is fixed to the rigid shaft 287, access being gained to the handwheel by a hinged door 292 (Fig. 3) in the floor of the body just forwardly of the rear seat 58.

The electrical system for actuating and controlling the top sections is shown diagrammatically in Figs. 19 and 20, and will now be described. A source of electromotive force, which may be the storage battery of the vehicle, is indicated at 300. For control of the rear top section, current flows from the battery through a lead 302 to a two-way manual switch 304 mounted on a plate 306 on the instrument panel of the automobile. The current flows thence through one or the other of parallel leads 308, 309 to the motor 218 for the rear top section, to actuate it in one direction or the other, depending upon which of the leads is energized. The lead 308 is controlled by a limit switch 310 which is located in the path of detent 98 (Fig. 1) so as to be opened when the rear top section 76 reaches its fully raised position, to thereby arrest the upward movement of the section 76. As will be seen in Fig. 20, the solenoid 226 is connected in a lead 314 which extends from the lead 309 to ground. The lead 309 is controlled by a limit switch 316 which forms part of the switch mechanism 228 (Fig. 1) and is opened by detent 98 when the rear top section 76 reaches its fully nested position, to arrest the downward movement of the section 76.

For control of the front top section, a lead 330 (Fig. 20) leads from lead 302 to a two-way manual switch 332 mounted on the plate 306. Current flows thence through one or the other of leads 334, 335. Lead 334 connects through switches 336 and 257 and lead 337 to the motor 268 of the hydraulic mechanism. Switches 336 and 257 are shown also in Fig. 16, in their relation to the hydraulic mechanism. The operation of switch 257 by extension 256 has been described above. Switch 336 is a two-way switch which is mounted on a stationary extension 338 of the body bracket 242 in the path of an extension 339 on the upper bracket arm 234, so that movement of the bracket arm 234 by the screwshaft 246 to its uppermost position causes the extension 339 to operate the switch 336 from the position wherein it connects lead 334 to lead 340, to the position shown in Fig. 20 wherein it connects lead 334 to lead 337, thereby stopping the actuation of screwshaft 246 and causing motor 268 to actuate the pump 267. In addition, the extension 339 carries the two-way switch 259, which lies in the path of the extension 256 of the base plate 250, so that when the hydraulic cylinder 248 reaches its uppermost position the switch 259 is operated from the position shown in Fig. 20, wherein it connects lead 335 to lead 344, to its lower position, wherein it connects lead 335 to lead 348, thereby stopping the hydraulic mechanism and causing motor 288 to rotate the screwshaft 246 in such direction as to move the rear top section downwardly.

In its lower position, switch 336 connects lead 334 through lead 340 to the motor 288 of the screwshaft 246 to cause the screwshaft to raise bracket 234, 238, and with it the front top section. Lead 335 connects through switch 259 (also shown in Fig. 16) and 344 to the motor 268.

In order to prevent actuation of the front top section while the rear top section is in any position other than its fully nested position, a safety switch 346 (which is part of the switch mechanism indicated at 228 in Fig. 1) is connected in the lead 330. In its lower position (Fig. 20) switch 259 connects lead 335 to lead 348, provided with a limit switch 350, and thence to the motor 288. As will be seen in Figs. 1 and 17, switch 350 is mounted in the path of an arm 341 fixed to the bracket arm 234, so as to be opened when the bracket 234, 238 reaches the lower limit of its movement.

Although the various automatically actuated switches for control of the front top section have been shown as located at the left side of the vehicle, it will be apparent that they may be located at the right side, or some on one side of the vehicle and some on the other.

*Operation*

The operation of the device is as follows. Let it be assumed that both top sections are in their raised positions, as indicated in Fig. 4, the actuating mechanism being in the position indicated in Figs. 1, 15 and 16, and that it is desired to lower both of them into the booth, to the positions indicated in Fig. 7. If the top is provided with latches, which may be of the type disclosed in my Patent No. 2,486,905, granted November 1, 1949, these latches will first be released. This having been done, the operator will then move the switch 304 from its "up" to its "down" position, thereby connecting lead 302 to leads 309 and 314. The lead 314 will conduct current to the solenoid 226, which will thereupon retract the bolt 224 to permit downward movement of the rear section 76. The switch 316, being a normally closed switch, will be in closed position at this stage of the operation. Actuation of motor 218 through lead 309 will cause the rear section 76 to move downwardly to its fully nested position, whereupon the detent 98 will contact the switch mechanism 228 and open the switch 316, deenergizing the motor 218 and arresting further downward movement of the rear top section.

In order to raise the rear top section, the operator wil move the switch 304 to its "up" position, whereupon current will flow from the battery 300 through leads 302 and 303, through the normally closed switch 318, and thence to the motor 218, causing it to rotate in the reverse direction and raise the section 76. This movement will continue until the detent 98 contacts the limit switch 318, opening the same and deenergizing the motor so as to arrest further upward movement of the section 76. The section 76 will be held in its raised position by the latch mechanism 224, 226, which is operated mechanically by the detent 98 in its upward movement.

In order to lower the front top section, the operator will move the switch 332 to its "down" position. If at this point the rear top section 76 is in its raised position, the switch 346 will be open because the detent 98 will not be in contact with the switch mechanism 228, and no action will take place. However, if the rear top section 76 is in its fully lowered position, detent 98 will be in contact with the switch mechanism 228 and the switch 346 will therefore be closed. Current will therefore flow from the battery 300 through lead 330, switch 346, switch 332, lead 335, switch 259, and lead 344, to the motor 268, which will cause the pump 267 to pump fluid under pressure through connection 264 into the upper portion of hydraulic cylinder 248, thereby moving the cylinder upwardly. Upward movement of the cylinder wil carry with it the base plate 250, thereby causing the link 255 to rotate the extension 230 about the pivot 232. This will cause rotation of the entire front top section until the extension 256 has contacted the switch 259 and moved it to its lower position (Fig. 20), whereupon further movement of the hydraulic cylinder will be stopped, the front top section being then in the position indicated at 74a in Fig. 1. Movement of the switch 259 from the upper to the lower position shown in Fig. 20 will complete the circuit through leads 330, 335 and 348 to the motor 268, which will thereupon cause the screwshaft 246 to rotate in such direction as to lower the front top section from the position indicated at 74a in Fig. 1 into the booth. This movement will proceed until the front top section has reached the fully nested position indicated at 74b in Fig. 1. At this point, the extension 341 (Fig. 17) will contact the switch 350, arresting further movement of the screwshaft.

In order to raise the front top section, the operator will move the switch 332 to its "up" position, thereby completing a circuit through leads 330, 334 and 340 to motor 263, causing it to rotate the screwshaft 246 in such direction as to raise the bracket 234, 238, and with it the front top section 74, from the position indicated at 74b in Fig. 1, to the position indicated at 74a in the same figure. At this point, the extension 339 will contact the switch 336, moving it from its lower to its upper position (Fig. 20) and thereby completing the circuit through leads 330, 334 and 337 to the motor 268. The switch 257 will be in its closed position at this point, due to the fact that extension 256 has moved out of contact with said switch. The motor 268 will thereupon actuate pump 267 in such manner as to force hydraulic fluid under pressure through connection 265 to the lower portion of the hydraulic cylinder 248. The cylinder 248 will thereupon move downwardly, rotating the section 74 about pivot 232 from the position 74a to the full line position shown in Fig. 5.

If the operator attempts to raise or lower the front top section while the rear top section is in its raised position, or in any position other than the fully nested position indicated in dotted lines in Fig. 1, no operation will result, because the switch 346 will be open, due to the detent 98 not being in contact with the switch mechanism 228. When the front top section has reached its fully raised position, indicated in full lines in Fig. 5, the extension 256 will contact and open the normally closed switch 257, thereby arresting further movement of the motor 268 and the hydraulic cylinder 248.

If both top sections are in their raised positions and the operator wishes to convert the body to the Victoria top type shown in Fig. 6, he will first lower the rear top section into the booth, then lower the front top section into the booth, and then raise the rear top section to its normal or raised position. The manner of converting the top from any of the types shown in Figs. 4, 5, 6 and 7 to any of the other types shown in those figures will be apparent from the foregoing description.

Although the invention has been described with reference to a particular embodiment thereof, it may be embodied in other forms within the skill of artisans in this art, and is not limited except in accordance with the terms of the following claims.

I claim:

1. A vehicle body comprising separable front and rear top sections, two pillars forming part of the front section, two pillars forming part of the rear section so positioned outwardly of said first mentioned two pillars as to provide apertures therebetween, weatherstrips mounted for pivotal movement on at least one pillar on each side of one of said top sections to seal said apertures, means operable from within the body to seal and unseal said apertures by turning said weatherstrips to disengage their contact and friction between each set of pillars to facilitate initial opening of the rear top section.

2. A vehicle body comprising separable front and rear top sections, said rear top section being collapsible, two pillars forming part of the front top section, two pillars forming part of the rear top section so positioned outwardly of said first mentioned two pillars as to provide apertures therebetween, weatherstrips on at least one pillar on each side of one of said top sections to seal said apertures, and means operable from within the body to disengage said weatherstrips from contact and friction between the respective sets of pillars to facilitate opening of the rear top section.

3. In a convertible vehicle body having stationary side structures at opposite sides of the body and having doors and front and rear seats, said side structures and doors terminating in a belt line extending fore and aft of the vehicle at an elevation intermediate the top and bottom of said body, a transverse forward top section above said front seat movable rearwardly and forwardly to and from a lowered position, a pair of substantially horizontal forward tracks in said structures, a rear top section normally covering the area between said structures, members on said rear top sections movable in said forward tracks, a second pair of arcuate tracks behind and below said forward tracks extending downwardly and forwardly in said body below said belt line, and power means including gears coacting with said second-mentioned tracks for moving said rear top section to and from a lowered position.

4. In a convertible vehicle comprising front and rear seats and a body having a lower portion terminating in a belt line dividing the top from said lower portion, two pairs of opposed tracks, an upper forward substantially horizontal pair and a downwardly and forwardly curved arcuate rear pair of tracks located entirely in said lower portion, a movable transverse rear top section comprising members coacting with said tracks, and power means on said rear pair of tracks for moving said section to and from a lowered position behind the rear seat in the rear part of said body while rotating the same through approximately 90°.

5. The invention defined in claim 4, comprising in addition a front top section movable to and from a lowered position independently of the rear top section only after the rear top section has been lowered into the booth.

6. In a convertible vehicle body having a belt line dividing the top from the remainder of said body, a movable top section having its lower edges normally lying in the plane of said belt line and having its forward edges directed upwardly, a pair of tracks below said belt line slidably supporting the side parts of said lower edges, and a second pair of tracks each extending from a point adjacent the rear part of said lower edges of the said top section and thence downwardly and forwardly, and power means for moving said rear part of said lower rear edges along said second pair of tracks, thereby causing the side part of said lower edges to move along the first-mentioned pair of tracks.

7. In a convertible vehicle body having a generally horizontal belt line dividing the top from the lower portion of the body, front and rear seats in said body, a booth at the rear of the rear seat, a front top section comprising a rigid roof section and two pillars extending downwardly from the rear thereof, a rear top section having its lower edge lying in the plane of the belt line and its upwardly directed forward edges located laterally and outwardly from said pillars, and power means for moving said sections into said booth in nested relation, the front section inside the rear section, and for selectively returning them to upright position, said front section being operable only after said rear section is in said booth.

8. The invention defined in claim 7, comprising in addition movable weatherstrips obturating the space between said pillars and the forward edges of said rear top section.

9. In a vehicle body, a rigid retractable rear top section having two pillars at the forward lateral edges thereof, a rigid retractable front top section having two pillars at the rear lateral edges thereof constructed and arranged to be positioned inwardly and in spaced relation to the first-mentioned pillars when both sections are in upright position, so that the second-mentioned pillars when viewed from inside said body completely obscure the first-mentioned pillars and a weatherstrip mounted on one pillar on each side of the top sections and movable to and from a position wherein it obturates the space between the two pillars.

10. A vehicle body comprising a top formed of separately movable front and rear sections, a belt line dividing the top from the remainder of said body, a compartment in the body to receive said sections in substantially vertical nested position, and means operable only after the rear section has been moved into said compartment for moving the front section into said compartment and including means for rotating said front section rearwardly about an axis adjacent said belt line into a predetermined plane and means for moving said front section and said axis in said plane downwardly into said compartment, said top sections being of the continuous and complete roof cross-section type without stationary side roof rails so that a passenger need not lower his head when entering or leaving said body when the roof sections are in lowered position.

JOHN W. J. ACKERMANS.

REFERENCES CITED

The following references are of record in the file of this patent:

UNITED STATES PATENTS

| Number | Name | Date |
|---|---|---|
| 1,236,207 | Oliver | Aug. 7, 1917 |
| 1,338,446 | Henderson | Apr. 27, 1920 |
| 1,956,616 | Holtom | May 1, 1934 |
| 2,007,873 | Paulin | July 9, 1935 |
| 2,013,314 | Metz | Sept. 3, 1935 |
| 2,191,269 | Atwater | Feb. 20, 1940 |
| 2,215,363 | Rupple | Sept. 17, 1940 |
| 2,241,755 | Zaccone | May 13, 1941 |
| 2,309,926 | Baker | Feb. 2, 1943 |
| 2,397,232 | Mann | Mar. 26, 1946 |

FOREIGN PATENTS

| Number | Country | Date |
|---|---|---|
| 18,839 | Great Britain | June 18, 1914 |
| 134,935 | Great Britain | Nov. 14, 1919 |
| 449,825 | Great Britain | July 6, 1936 |